United States Patent [19]

Nylund et al.

[11] 4,149,638
[45] Apr. 17, 1979

[54] METHOD AND APPARATUS FOR ORIENTING A PLATE

[75] Inventors: Kalevi Nylund, Rauma; Pertti Tuominen, Kaaro, both of Finland

[73] Assignee: Lonnstrom Oy, Finland

[21] Appl. No.: 808,392

[22] Filed: Jun. 20, 1977

[30] Foreign Application Priority Data

Jun. 21, 1976 [FI] Finland .................................. 761800

[51] Int. Cl.² .......................................... B65G 47/52
[52] U.S. Cl. ................... 198/406; 198/469; 198/477; 198/486; 198/575; 198/680; 198/406; 414/737
[58] Field of Search ............... 214/1 R, 1 BD, 1 BV, 214/147 T, 1 S, 8.5 D, 152 Q, 1 QD, 146.5, 148; 198/344, 345, 375, 378, 379, 406, 409, 410, 412, 477, 486, 467, 469, 572, 575, 649, 650, 645, 680, 681, 678, 858, 859

[56] References Cited

U.S. PATENT DOCUMENTS

| 1,098,090 | 5/1914 | Brower .......................... 214/1 S X |
| 2,667,981 | 2/1954 | Tusting et al. .................. 198/650 X |
| 2,769,519 | 11/1956 | Hauck .............................. 198/467 |
| 3,126,108 | 3/1964 | Langhart ......................... 214/1 S X |
| 3,410,387 | 11/1968 | Wennberg et al. ................ 198/409 |
| 4,020,944 | 5/1977 | Kojima et al. .................. 198/678 X |

FOREIGN PATENT DOCUMENTS

2300267 7/1974 Fed. Rep. of Germany ........... 198/409

*Primary Examiner*—Frank E. Werner
*Attorney, Agent, or Firm*—Steinberg & Blake

[57] ABSTRACT

A method and apparatus are provided for orienting a plate such as a seed plate in an electrolytic refining plant. While the plate is in a horizontal attitude and connected with a suspending lug which in turn is connected to a supporting rod, the plate is transported by a manufacturing line conveyer to a predetermined location where there is lowered into engagement with the plate a suction structure capable of holding and carrying the plate. The suction structure together with the plate and the supporting rod and suspension lug are raised away from the manufacturing line conveyer to a transfer location where the plate is capable of swinging to an upright attitude while clearing the above conveyer. At the transfer location the suction action of the suction structure is released, and a pair of rod-supporting members are displaced into engagement with opposed ends of the rod to support the latter when the plate is released to swing to its upright attitude, by gravity. At the transfer location a transporting conveyer is situated in part beneath the supporting rod, and when the plate swings to its upright attitude the members supporting the supporting rod are retracted away from the latter so that this rod can fall together with the suspension lug and plate with the rod being received by the transporting conveyer which then can transport the plate while it hangs in an upright attitude to a further location.

17 Claims, 6 Drawing Figures

METHOD AND APPARATUS FOR ORIENTING A PLATE

BACKGROUND OF THE INVENTION

The present invention relates to methods and apparatus for orienting plates, particularly seed plates which in an electrolytic refining plant are conveyed by a manufacturing line conveyer to a predetermined location where it is required to reorient the plates from their horizontal attitude on the above conveyer to an upright attitude which the plates have while they are further transported by a transporting conveyer.

Such plates when conveyed by the manufacturing line conveyer are in a condition attached to one or more suspension lugs which in turn are engaged by a supporting rod.

Thus, the present invention relates to a method and apparatus for handling plates of the above type so that they can be reoriented from their horizontal attitude on the manufacturing line conveyer to an upright attitude in which they are suspended from the transporting conveyer.

Seed plates in electrolytic refining plants are initial or starting plates on which a cathode grows during the electrolysis operation. These seed plates are manufactured along a manufacturing line which is provided with means for cutting and straightening the seed plates as well as with means for feeding the supporting rods and means for feeding and bending strips which form the suspension lugs, the latter being riveted by a riveting press to the plates, although the suspension lugs can also be spot-welded to the seed plate with the supporting rod remaining in a loop which is formed on each suspension lug strip. Thus, the completed seed plates are fixed with one or more suspension lugs the loops of which receive a supporting rod and are conveyed by way the manufacturing line conveyer to a location where the plates are raised by way of a suitable raising means and are then caused to hang from the supporting rod in a vertical position while carried by a seed plate storage or collecting conveyer or any other desired conveyer which serves to transport the seed plates for further treatment.

A raising means for changing the orientation of such seed plates have already been disclosed, for example, in Swedish Pat. No. 329,011. The raising means shown in the latter patent consists of a horizontal table which is arranged to turn about an axis. The turning movement of this table is carried out by way of a hydraulic cylinder. However, experience has shown that the operation of this raising means forms the slowest step in the seed plate manufacturing line, inasmuch as all other functions which take place along the seed plate manufacturing line conveyer must wait for the return motion of the raising means. Therefore, with the prior art method and apparatus it is not possible to achieve an operating speed greater than that which is permitted by the necessity of raising and reorienting the plates, so that this latter part of the method and apparatus in the known manufacturing lines presents a serious limitation on the output.

SUMMARY OF THE INVENTION

It is accordingly a primary object of the method and apparatus of the invention to avoid the above drawbacks by providing a plate-orienting method and apparatus which will not delay the other operations along the manufacturing line, so that in this way it is possible to achieve a greater output than has heretofore been possible.

More specifically, it is an object of the present invention to provide a method and apparatus according to which it is not essential to wait for the return of the plate-raising means to its initial position, and as a result it becomes possible to achieve considerably increased operating speeds, as compared with previously known methods and apparatus.

It is furthermore an object of the present invention to provide a method and apparatus according to which, even though there is a high operating speed, nevertheless the possibility of encountering trouble during the operation is eliminated in a highly efficient manner.

According to the method and apparatus of the invention the seed plate manufacturing line conveyer has its operation terminated when the seed plate on this conveyer reaches a predetermined location, the seed plate at this time being fixed with at least one suspension lug which in turn is operatively connected with a supporting rod. At the predetermined location of the seed plate a suction means is lowered to engage and hold the seed plate by suction, and then with the seed plate thus held by the suction means the latter together with the seed plate and the lug and supporting rod connected thereto are raised to a given elevation away from the manufacturing line conveyer, while a pair of rod-engaging means are displaced by a suitable operating means into engagement with opposed ends of the rod to support the latter. In this way the plate is moved from the manufacturing conveyer to a transfer location, and upon reaching the latter location the action of the suction means is released so that the seed plate is free to swing to an upright attitude, the transfer location being such that when this plate swings to its upright attitude it will clear the manufacturing line conveyer while remaining supported by way of the suspension lug on the supporting rod. The movement of the supporting rod together with the seed plate to the transfer location situates the supporting rod over part of a transporting conveyer, and at the latter location after the plate swings to its upright position the pair of rod-engaging means are retracted away from the rod so that the latter can fall onto the transporting conveyer. Thus the seed plate is now suspended from the transporting conveyer by way of the suspension lug and supporting rod and the transporting conveyer is operated to transport the plate which is now in an upright attitude to a further location.

Thus, the apparatus of the invention includes the above operating means operatively connected with the pair of rod-engaging means for displacing the latter to the position supporting the rod at its opposite ends as well as for retracting the pair of rod-engaging means away from the rod, a suitable frame being provided to carry the suction means, while additional means are operatively connected with this frame to lower the suction means into engagement with the seed plate and to cause the latter to be lifted by way of the suction means away from the manufacturing line conveyer, with the plate being held and carried at this time by the suction means, the plate being moved in this way to a predetermined elevation away from the manufacturing line conveyer.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
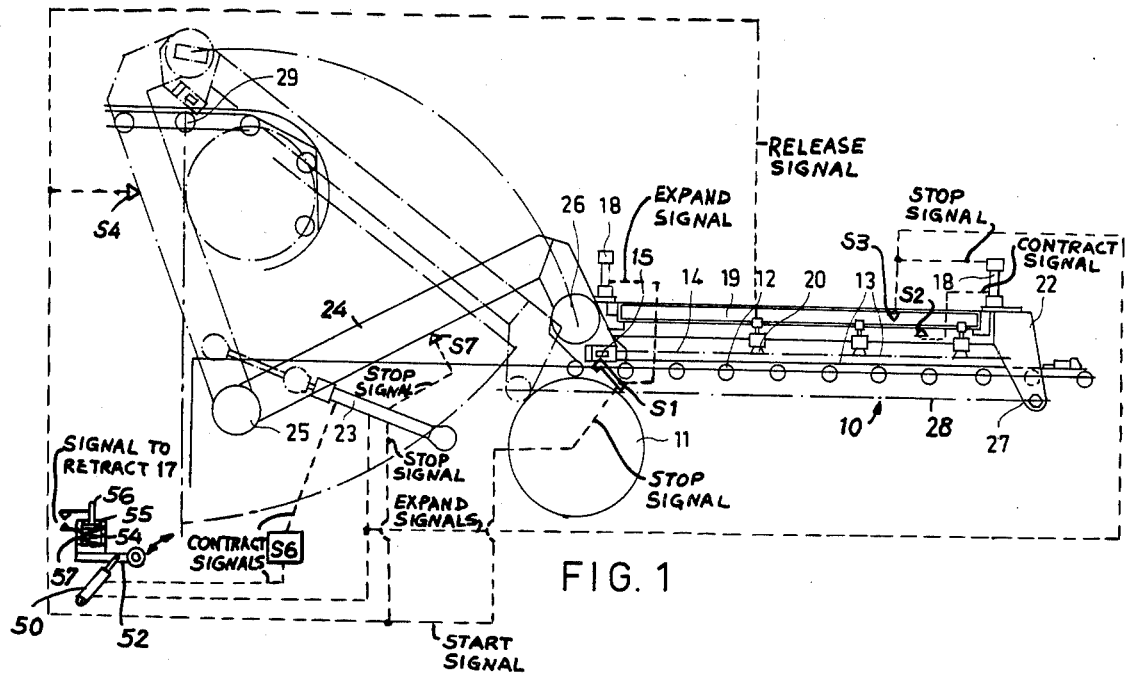
FIG. 1 is a schematic fragmentary side elevation of one possible method and apparatus according to the invention, FIG. 1 showing also in a schematic manner various controls for starting and stopping operation of various components.
Figure 2:
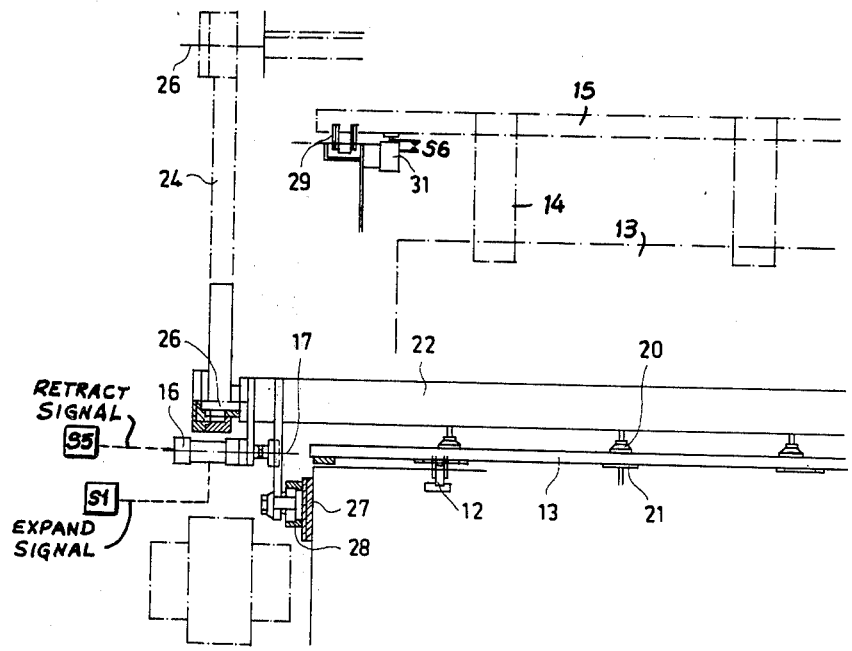
FIG. 2 is a fragmentary schematic end elevation of the structure of FIG. 1 as seen from the right of FIG. 1, with FIG. 2 also schematically showing control components.
Figure 3:
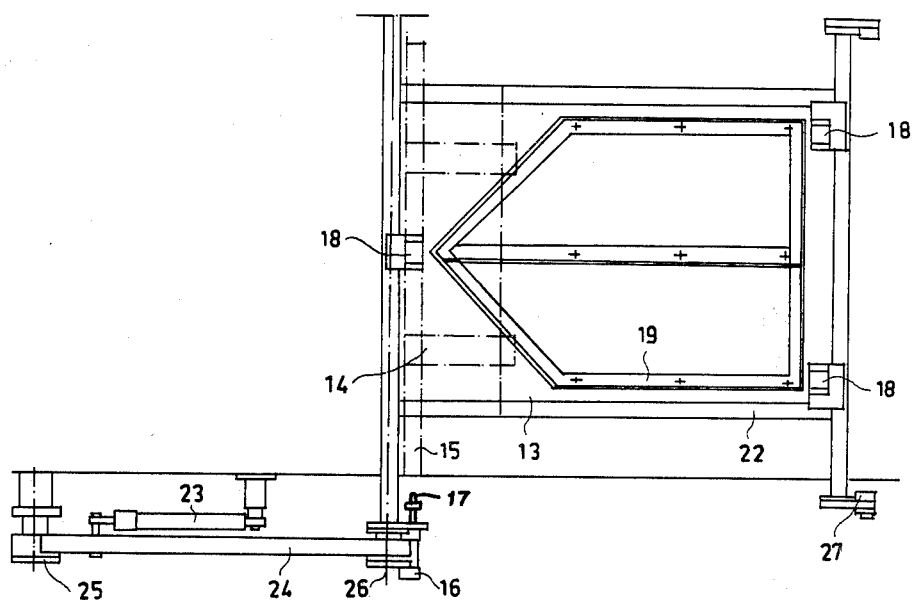
FIG. 3 is a fragmentary schematic top plan view of part of the structure shown in FIG. 1.

Referring now to the drawings, there is fragmentarily and schematically illustrated in FIGS. 1 and 2 a manufacturing line conveyer means 10 which includes the fragmentarily illustrated endless chain 12 as well as a number of sprocket wheels, including the driven wheel 11 which is indicated in FIG. 1. This conveyer means 10 serves to convey a completed seed plate assembly to a predetermined location which, as viewed in FIG. 1, is situated just above and extends to the right from the vertical axis passing through the center of the wheel 11. The seed plate assembly includes the seed plate 13 which has previously been fixed to at least one suspension lug 14 which in turn is connected with a supporting rod 15. As is apparent from FIG. 3, the assembly 13-15 includes a pair of support lugs 14 shown in dot-dash lines in FIG. 3, these lugs having at their left ends, as viewed in FIG. 3, loops which extend around the supporting rod 15 of the assembly.

Thus, the arrangement is such that when the manufacturing line conveyer means 10 conveys the seed plate 13 to the predetermined location shown in FIG. 1, the operation of the conveyer means terminates. For this purpose a photocell, limit switch, or another control member known in itself is situated so as to supply a permission-to-start pulse to the operation which is described below for carrying out the method of the invention with the apparatus of the invention. In the example shown in FIG. 1 it will be seen that when the rod 15 reaches the position indicated in FIG. 1 it actuates a switch S1, and through suitable unillustrated circuitry in the manner which is schematically shown in FIG. 1 the switch S1 when actuated by the rod 15 creates a stop signal which serves to stop the turning of the wheel 11 and thus stop the operation of the conveyer means 10.

The switch S1 in addition to forming a means for stopping the operation of the conveyer means 10 also forms a means which initiates the operation of the fluid-pressure means 16 indicated most clearly in FIG. 2. This means 16 includes a cylinder to which fluid under pressure is supplied in response to actuation of the switch S1 by the rod 15, so that an expand signal is delivered to the cylinder 16 in the manner shown schematically in FIG. 2. Another cylinder 16 is situated at the opposite side of the apparatus and these cylinders 16 when receiving the fluid under pressure serve to displace a pair of rod-engaging means 17 toward each other and into opposed hollow end regions of the rod 15. Thus, the pair of rod-engaging means 17 when thus displaced by the means 16 into the hollow end regions of the rod 15 will serve to engage and support the rod 15.

Simultaneously with the stopping of the conveyer means 10 and the displacement of the pins 17 into the hollow end regions of the rod 15, a signal is derived from the switch S1 to cause the cylinders 18 shown in FIG. 1 to receive a fluid under pressure, an expand signal being shown schematically in FIG. 1 extending from the switch S1 to the left cylinder 18 shown in FIG. 1, but it is to be understood that all of the cylinders 18 are simultaneously operated in exactly the same way. The several cylinders 18 are carried by a carriage 22 which in the position of FIG. 1 extends over the predetermined location where the plate 13 is located, this carriage 22 having at its right end, as viewed in FIG. 1, a pair of downwardly extending opposed lugs which terminate at their lower ends, on opposite sides of the conveyer 12 in a pair of rollers 27 which are freely turnable on the lower ends of the lugs of the carriage 22 and which are guided in horizontal guide rails 28, one of which is shown in section in FIG. 2, these guide rails 28 extending horizontally, as indicated by the dot-dash line in FIG. 1, and serving as a guide means for the carriage means 22. This carriage means 22 as well as the guide means 28 and the fluid-pressure means 18 all form part of a suction means which includes a frame 19 operatively connected to the pistons of the cylinders 18 so as to be lowered when the cylinders 18, which are mounted on a carriage means 22, receive the expand signal in response to actuation of the switch S1 by the rod 15, while when a contract signal is received by the cylinders 18, the frame 19 is raised. The frame 19 of the suction means supports one or more suction cups 20 which are directed with their hollow interiors facing downwardly, and the lowering of the frame 19 will place the suction cups 20 against the top surface of the horizontal plate 13, these suction cups 20 pressing against the top surface of the plate 13 so as to be capable of holding and raising the plate 13 by suction, the lugs 14 and rod 15 also being raised together with the plate 13 when the frame 19 is raised. The plate 13 rests against the chains 12 as well as a planar member 21 indicated in FIG. 2, so that when the suction cups 20 press downwardly against the plate 13 the latter will be prevented from moving downwardly by the chains 12 and the member 21. Thus the chains 12 and the member 21 are situated beneath the plate 13 to determine the elevation thereof when the suction cups 20 are pressed downwardly against the plate 13. These suction cups 20 may operate with the natural suction or they may be operatively connected to a compressed air ejector, a vacuum pump, or the like. After the frame 19 has thus pressed the suction cups 20 against the plate 13, this frame 19 engages a switch S2 which is indicated schematically in FIG. 1, and this switch provides the contract signal to the cylinders 18 so that after the frame 19 has been lowered through a sufficient distance the cylinders 18 operate automatically to raise the frame 19 together with the plate 13 which now moves upwardly away from the chain 12 together with the lugs 14 and rod 15. The elevation to which the frame 19 is raised is predetermined by way of adjusting the elevation of a switch S3 which is schematically indicated in FIG. 1 and which is engaged by the frame 19 when the latter moves upwardly, this switch S3 being operatively connected with the cylinders 18 to stop the contraction thereof, or in other words to stop the upward movement of the pistons whose rods are fixed to the frame 19, so that the elevation to which the latter is raised is predetermined in this manner. It is to be noted that the carriage means 22 of the suction means which includes the suction cups 20 and the frame 19 carries not only the latter frame 19 by way of the fluid-pressure means 18 supported on the carriage means 22 but also the means 16 connected to the rod-engaging means 17, so that all of these parts form structure carried by and connected with the carriage means 22.

In addition to terminating the elevation of the frame 19 the switch S3 when actuated by the frame 19 transmits an expand signal to a cylinder 23 which is indicated in FIG. 1, this cylinder 23 being pivotally supported at its lower right end, as viewed in FIG. 1, on any suitable structure. The result is that the actuation of the switch S3 causes a piston to be advanced to the left toward the upper left part of the cylinder 23 as viewed in FIG. 1, thus causing the piston rod of this piston to move outwardly to the position indicated in dot-dash lines in FIG. 1. This piston rod is pivotally connected with a lever means 24 which is supported for turning movement by a stationary pivot 25, and the opposed end of the lever means 24 is pivotally connected at 26 to the carriage means 22. Thus the expanding of the cylinder 23 causes the lever means 24 to turn in a counterclockwise direction, as viewed in FIG. 1, to the position shown in dot-dash lines in FIG. 1 where the lever means 24 extends from the pivot 25 upwardly and inclined somewhat toward the left as viewed in FIG. 1. Of course a pair of such levers may be provided on opposite sides of the machine, and these levers are both connected by the pivots 26 to opposed left portions of the carriage means 22. The result is that the raising of the pair of lever means 24 will cause the pivots 26 to turn around the pivot 25, thus elevating the left part of the carriage means 22 while the rollers 27 ride along the guide means 28, so that in this way the entire carriage means 22 and all of the structure carried thereby is displaced to the dot-dash line position shown in FIG. 1. In this dot-dash line position of the carriage means 22, the plate 13 is located at a transfer location in which the plate 13 is inclined so as to be between the horizontal attitude at the predetermined location of FIG. 1 and an upright attitude, the plate 13 at this time of course being supported by the suction cups 20.

Figure 4:
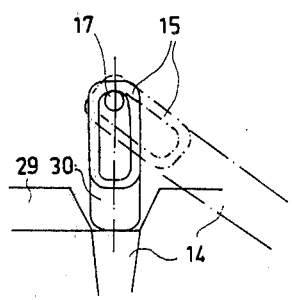
FIG. 4 is a schematic fragmentary illustration of part of the method and apparatus illustrating particularly how the supporting rod is acted upon to be received by a transporting conveyer.

As is shown schematically and fragmentarily at the upper left of FIG. 1, a transporting conveyer means 29, which is also fragmentarily illustrated in FIG. 2, has a part over which the rod 15 is moved when the carriage 22 is moved to the inclined dot-dash line position indicated in FIG. 1. Referring to FIG. 4 it will be seen that the upper runs of the chains of the conveyer 19 have a number of notches 30 one of which is indicated in FIG. 4, and the particular notch 30 shown in FIG. 4 is situated beneath the rod 15 when the carriage means 22 is in the inclined dot-dash position shown in FIG. 1. The transporting conveyer means 29 serves as a storage conveyer for transporting the several plates 13 while they are in an upright position for further treatment. In this upright position the plates 13 are suspended from the lugs 14 which in turn are held by the rods 15 which are received at their opposed ends in the notches 30 of the chain 29. Thus when the rod 15 is in the dot-dash line position shown in FIG. 4 it is still inclined together with the lugs 14 and plate 13 but is situated over the part 30 of the conveyer means 29.

When the lever means 24 reaches the dot-dash line position shown in FIG. 1, it actuates a switch S4 which is positioned in the path of movement of one of the levers 24, and the actuation of the switch S4 brings about a number of operations. Thus the actuation of the switch S4 will stop the supply of pressure fluid to the cylinder 23 so that the expansion at the latter terminates, as indicated by the stop-signal shown schematically in FIG. 1. Furthermore, the actuation of the switch S4 serves to deliver a release signal to the suction cups 20. These suction cups 20 communicate through suitable tubes carried by the frame 19 with a source of air under pressure which is now actuated upon engagement of the switch S4 by the lever 24 to deliver air to the interiors of the suction cups 20 so that the plate 13 is now released. The result is that the plate 13 is now free to swing to an upright position with the rod 15 being free to turn around the pins 17 while the lugs 14 of course turn with the rod 15 and the plate 13. Thus by way of the release signal delivered to the suction cups 20 of the suction means, the plate 13 is released so that it can by gravity swing to an upright position hanging from the rod 15 which is supported by the pins 17.

As is shown schematically in FIG. 1, when the switch S3 is actuated by the frame 19 to terminate the upward movement of the latter as well as to start the supply of pressure fluid to the cylinders 23 so as to provide expansion of the piston-and-cylinder means which raises the lever 24, a signal is also transmitted by way of the switch S3 to a cylinder 50 which receives fluid under pressure, this cylinder 50 being supported for pivotal movement at its lower left end, as viewed in FIG. 1, and having the piston rod of a piston which is slidable in the cylinder 50 connected to a lever 52 which is supported for pivotal movement at its right end, as viewed in FIG. 1. As a result, simultaneously with the expansion signal which is delivered to the cylinders 23, the cylinder 50 also receives an expansion signal so as to cause the lever 52 to turn in a clockwise direction to an upright position, the limit of expansion at the cylinder 50 being such that the displacement of the piston outwardly of the cylinder 50 situates the lever 52 in an upright vertical position. Of course, a pair of cylinders 50 are situated at opposite sides of the machine and cooperate with a pair of the levers 52 which are always in alignment with each other, and these levers 52 are fixed at their left end regions, as viewed in FIG. 1, to a transverse bar which carries a number of shock-absorbing units in the form of hollow cylinders 54 which support pistons 55 for movement in the cylinders 54, these pistons 55 being respectively connected with rods 56 and being urged outwardly by springs 57 which are housed in the cylinders 54. Thus, the result is that when the levers 52 are in their upright position, the pins 56 extend horizontally to be engaged by the plate 13 when it reaches a vertical position, the momentum of the plate 13 serving to displace the pins 56 slightly to compress the springs 57, which thereafter expand back to their initial positions so that in this way swinging movement of the plate 13 is damped and at the same time the plate 13 is free to hang in an upright position.

Moreover, as is shown schematically in FIG. 1, the inward displacement of one of the pins 56 when engaged by the swinging plate 13 causes closing of a switch S5 which transmits a signal to the structure supplying fluid under pressure to the cylinders 16, this signal causing fluid under pressure to be withdrawn from the cylinders 16 so that the pins 16 are retracted out of the opposed hollow end regions of the rod 15. It will be noted that FIG. 2 indicates the retract signal which is delivered by the switch S5. The result is that when the plate 13 reaches its vertical position a signal is given to retract the rod-engaging means 17 so that the rod 15 can now fall into the notches 30 of the transporting conveyor means 29.

In order to prevent the falling rod 15 from striking with an undesirable impact against the chains of the conveyor 29 in the notches 30 thereof, a damping means 31 is provided beneath each of the opposed end regions of the rod 15 in the path of downward movement thereof. Thus, as is shown in FIG. 2, the frame structure which supports the conveyor means 29, such as by supporting the sprocket wheels thereof for turning movement, carries a pair of damping means 31, one of which is shown in FIG. 2, this pair of damping means being situated in alignment with the notches 30. This damping means can simply be in the form of a cylinder having at its lower region a spring pressing upwardly against a piston which is fixed with a piston rod extending outwardly from the cylinder, upwardly therefrom, and carrying a small plate against which the end region of the rod 15 falls so as to cause the spring in the cylinder to become compressed and thus damp the downward movement of the rod 15 while the latter becomes situated in the notches 30 as is apparent from FIG. 2. Of course these operations also take place at the opposite end of the rod 15 where the structure shown at the left end region of the rod 15 in FIG. 2 is duplicated.

The weight of the rod 15 is sufficient to maintain the pistons of the damping means 31 depressed until the rods 15 are transported away from the damping means 31. As is shown schematically in FIG. 2, the downward movement of one of the piston rods of the damping means 31 causes a switch S6 to be closed, and this will initiate movement of the conveyor means 29 so that the latter now transports the rod 15 through a given increment which will situate the next notch 30 in alignment with the damping means 31 to receive the next rod 15. In addition, the closing of the switch S6 serves to actuate the structure which withdraws pressure fluid from the cylinders 23 and 50 so that the latter receive from the switch S6 the contract signals indicated schematically in FIG. 1, and thus the lever means 24 is returned to its solid line position in a clockwise direction, as viewed in FIG. 1, while at the same time the carriage means 22, and thus the entire suction means of which the carriage means 22 forms a part, is returned to its initial position situated over the predetermined location to which the plate 13 is delivered by way of the conveyor means 10. Thus immediately subsequent to retraction of the rod-engaging means 17 the carriage means 22 is returned to its initial position. Moreover, as is apparent from FIG. 1, the actuation of the switch S4 by the lever 24 when the latter reaches the dot-dash line position shown in FIG. 1, serves to transmit a starting signal to the conveyor means 10 so that the next plate 13 together with the lugs 14 and rod 15 are transported to the predetermined position shown in FIG. 1 while the above operations in connection with swinging of the plate 13 to its vertical position and return of the suction means to its initial position are taking place. The timing is such that just after the carriage means 22 has completed its return movement to its initial position shown in solid lines in FIG. 1, the conveyor means 10 displaces the next plate 13 together with the lugs 14 and rods 15 to the predetermined position shown in FIG. 1, so that the switch S1 is now actuated and the above operations are repeated.

A switch S7 can be situated in the path of clockwise turning movement of the lever 24, as shown in FIG. 1, to be actuated by the lever 24 for terminating the withdrawal of fluid under pressure from the cylinders 23 so that the lever 24 will stop in the position indicated in solid lines in FIG. 1.

It will be noted that the closing of the switch S6 at the damping means 31 by the falling of the rod 15 through a short distance into the notches 30 serves not only to initiate the return movement of the suction means to its initial position, as described above, as well as to start the operation of the conveyor 29, with some slight time delay, if desired, but in addition the closing of the switch S6 causes withdrawal of fluid from the cylinders 50 so that the levers 52 are retracted back to their horizontal positions indicated in FIG. 1, and thus when the plate 13 is transported by the conveyor 29 the levers 52 and the structure carried thereby will not be situated in the path of movement of the plate 13.

Of course, when the suction means is returned to its initial position, the wheels or rollers 27 of the carriage 22 of the suction means are guided also by the guide rails 28 which form a guide means as set forth above. When the carriage 22 thus is returned to its initial position, the actuation of the switch S7 may provide a pulse in parallel with the permission-to-operate pulse supplied by the switch S1, so that the above sequence of movements and operations are repeated after both pulses have been received.

Of course, the signal to the cylinders 50 for raising the pins 56 so as to enable the plate 13 to be precisely maintained in the vertical position to which it swings without excessive oscillation may be actuated by the switch S4, since it is not essential to turn the levers 52 in a clockwise direction as soon as the frame 19 moves upwardly into engagement with the switch S3. Also, it is not essential to supply fluid under pressure to the cylinders 16 by way of a signal derived from the switch S1. As long as the rod-engaging means 17 supports the rod 15 for turning movement before the suction is released from the suction cups 20 the structure will operate properly, so that the signal to displace the rod-engaging means 17 into engagement with the rod 15 can be derived from the switch S2 or the switch S3, or even the switch S4, rather than from the switch S1. Of course, the structure of the damping means 54–57 is such that the plates 13 will not be damaged when they engage the ends of the pins 56. Instead of springs behind the plates 55 it is possible to utilize compressed air.

The difference in height between the plate 13 when at the predetermined location to which it is transported by the conveyor means 10 when the plate 13 has its horizontal attitude and the plate 13 when at the transfer location where it has its inclined attitude may be selected freely, the only requirement being that when the suction means is released the bottom edge of the plate 13 will of course clear the conveyor means 10. In the embodiment illustrated the plate 13 will swing freely through about 55°. However, the structure may be changed so that at the transfer location the plate 13 is displaced to a greater extent beyond the horizontal attitude which it has at the predetermined location determined by the conveyor means 10. For example, the pivot 25 may be situated at a higher elevation and the plate 13 can be raised to a transfer location where it is almost in an upright position so that the extent of free swinging of the plate 13 when the suction means is released is correspondingly reduced.

Figure 5:
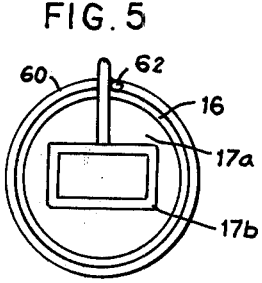
FIG. 5 is a schematic end view of a rod-engaging means and an operating means connected thereto, the embodiment of FIG. 5 being different from that of FIGS. 1-4.
Figure 6:
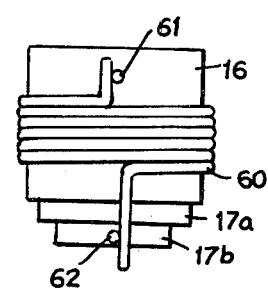
FIG. 6 is a schematic top plan view of the structure which is illustrated in FIG. 5.

In the above-described embodiment, the pair of rod-engaging means take the form of simple pins 17 which extend into hollow opposed end regions of the rod 15. It is, however, possible to provide a construction where the rod 15 is solid, and in this case holes may be drilled into the opposed end of the solid rod to receive the pins 17. However, if it is undesirable to drill such holes in a solid supporting rod, then a structure as shown in FIGS. 5 and 6 may be utilized. Thus, as is shown in FIGS. 5 and 6, each cylinder 16, one of which is indicated in FIGS. 5 and 6, supports in its interior a piston 17a which is displaced outwardly when fluid under pressure is supplied to the cylinder 16 upon receiving a suitable signal as set forth above. This piston 17a has at its outer free end a hollow substantially rectangular projection 17b, the hollow interior of which is aligned with the end of the rod 15 so that upon outward movement of the piston 17a the solid end of the rod 15 will be received in the rectangular member 17b. Of course with this construction the piston 17a is supported for turning movement in the cylinder 16. A spring 60 is coiled around the cylinder 16 and has one end engaging a stationary pin 61 carried by the stationary cylinder 16 while the opposite end of the spring 60 engages a pin 62 fixed to and extending upwardly from the rectangular member 17b which receives the end of rod 15. Thus, the pistons 17a will be displaced toward each other to situate the ends of the rod 15 in the rectangular member 17b, and then when the suction is released at the suction cups 20 in the manner described above, the weight of the downwardly swinging plate 13 will cause the pistons 17a and the members 17b therewith to turn in a clockwise direction as viewed in FIG. 5, in opposition to the force of the spring 60, the weight of the plate 13, the lugs 14 and the rod 15 being sufficient for this purpose. The plate 13 will now also hang in a vertical direction, and it will be noted that the springs 60 may in this embodiment be utilized to damp the swinging movement of the plate 13 so that the levers 52 and the damping means 54-57 need not be utilized with the embodiment of FIGS. 5 and 6. Thus, with the embodiment of FIGS. 5 and 6 it is possible to utilize the switch S1 to cause the pistons 17a to be displaced toward each other so that the rod-engaging means 17a, 17b, of FIG. 6 will engage and support the rod 15, while a switch different from the switch S5 can be used to detect when the plate 13 reaches a vertical position so as to initiate the retraction of the rod-engaging means 17a, 17b, from the rod 15 so as to release the latter to fall in the notches 30. Thus, a suitable photocell may detect when the plate 13 reaches its vertical position so as to provide the signal retracting the rod-engaging means of FIGS. 5 and 6, or a further switch may be located, for example, in the path of movement of the pin 62 to be engaged by the latter when it reaches a horizontal position, indicating that the plate 13 is vertical, so that through such an additional switch it is also possible to provide the signal which retracts the pistons 17a back into the cylinders 16.

Of course, once the members 17b are retracted outwardly beyond the rod 15, the springs 60 act to return the parts to the position shown in the positions 5 and 6.

It is to be noted that while only certain advantageous embodiments of the invention have been set forth above, it will be obvious to persons skilled in the art that certain details of the invention may vary quite widely within the scope of the inventive concept defined by the claims which follow.

What is claimed is:

1. In a method for displacing a plate, such as a seed plate in an electrolytic refining plant, from a substantially horizontal attitude, in which the plate is conveyed by a manufacturing line conveyer while the plate is fixed with at least one suspension lug which in turn is connected to a supporting rod, to a substantially upright attitude where the plate is suspended by way of said lug from said supporting rod with the latter supported by a transporting conveyer which serves to transport the plate while it is in an upright attitude, the steps of conveying the plate together with said lug attached thereto and said supporting rod engaged by said lug by way of said manufacturing line conveyer to a predetermined location, while said plate is in said horizontal attitude, terminating the operation of said manufacturing line conveyer when said plate reaches said predetermined location, then lowering engagement with said plate when the latter is at said predetermined location a suction means which by suction is capable of holding said plate together with said lug and supporting rod, then raising said suction means while the latter holds said plate to a transfer location where said plate is capable of swinging to said upright attitude while clearing said manufacturing line conveyer and where said rod is situated over a part of said transporting conveyer to be received by said part thereof while said plate is suspended from said rod by way of said lug, moving a pair of support members respectively into engagement with opposed ends of said rod after said plate reaches said predetermined location and before said plate reaches said transfer location, so that at the latter location said rod is supported by said support members, operating said suction means to release said plate when the latter has reached said transfer location so that at the transfer location said plate is released to swing to said upright attitude, then, when said plate reaches said upright attitude, retracting said support members to release said rod so that the latter can fall to said part of said transporting conveyer, operating the latter, when said rod is received thereby, to transport said plate while it is in said upright attitude, and, after said plate reaches said transfer location, resuming the operation of said manufacturing line conveyer and returning said suction means to its initial position, so that the above operations can then be repeated with the next plate when the latter reaches said predetermined location.

2. In a method as recited in claim 1 and wherein when said plate is at said transfer location, said plate is in an inclined attitude between said horizontal and upright attitudes so that when swinging to said upright attitude said plate need only swing through an angle which is substantially less than 90°.

3. In a method as recited in claim 1 and including the step of damping the falling of said rod to said part of said transporting conveyer.

4. In a method as recited in claim 1 and including the step of damping the swinging movement of said plate when the latter reaches said upright attitude.

5. In a method as recited in claim 1 and wherein the resuming of the operation of said manufacturing line conveyer is carried out prior to the time when said suction means has completed its return back to its initial position, so that at least part of the return of said suction means to its initial position takes place simultaneously with operation of said manufacturing line conveyer.

6. In a method as recited in claim 1 wherein the return of said suction means to its initial position is carried out immediately after retraction of said support members from said rod.

7. In an apparatus for displacing a plate, such as a seed plate in an electrolytic refining plant, from a substantially horizontal attitude to a substantially upright attitude, manufacturing line conveyer means for supporting a plate in a horizontal attitude while conveying said plate to a predetermined location and while the plate is fixed with at least one suspension lug with the latter connected to a supporting rod, means connected operatively with said manufacturing line conveyer means for terminating the operation thereof when said plate reaches said predetermined location, suction means for holding and carrying said plate with said lug connected thereto and with said rod engaged by said lug, said suction means having an initial position situated over said predetermined location, means connected with said suction means for lowering the latter into engagement with said plate when said plate is at said predetermined location and for then raising said suction means together with said plate, lug, and supporting rod away from said manufacturing line conveyer means to a transfer location where said plate is capable of swinging to an upright attitude while clearing said manufacturing line conveyer means, transporting conveyer means having a part situated beneath said rod when said plate is at said transfer location, a pair of rod-engaging means for engaging and supporting opposed ends of said rod at least when said plate is at said transfer location, and means connected operatively with said pair of rod-engaging means for moving the latter into engagement with opposed ends of said rod after said plate reaches said predetermined location and before said plate reaches said transfer location, so that said rod is supported by said pair of rod-engaging means when said plate is at said transfer location, release means operatively connected with said suction means for actuating the latter to release said plate when the latter is at said transfer location and while said rod is supported by said pair of rod-engaging means, so that upon release of said plate the latter is free to swing to said upright attitude, said means operatively connected with said pair of rod-engaging means then operating to retract said pair of rod-engaging means from said rod so that the latter is free to fall to said part of said transport conveyer means, and means connected with said manufacturing line conveyer means and with said means which raises said suction means for actuating both of the latter means to resume operation of said manufacturing line conveyer means and to return said suction means to said initial position thereof after said plate has been moved to said transfer location, so that the above operations can then be repeated.

8. The apparatus of claim 7 and wherein said means connected with said suction means for lowering the latter into engagement with said plate includes a fluid-pressure cylinder-and-piston means.

9. The apparatus of claim 7 and wherein said means operatively connected with said pair of rod-engaging means includes a fuid-pressure cylinder-and-piston means.

10. The apparatus of claim 7 and wherein said means connected with said suction means for raising the latter and for returning said suction means to said initial position thereof includes a carriage means carrying said suction means and a guide means guiding said carriage means for movement, said carriage means being situated at least in part over said manufacturing line conveyer means at said predetermined location when said suction means is in said initial position thereof.

11. The apparatus of claim 10 and wherein said means connected with said suction means includes in addition to said carriage means a turnable lever means pivotally connected with said carriage means for turning the latter while a portion thereof is guided by said guiding means upwardly away from said line conveyer means while moving said suction means together with said plate from said predetermined location to said transfer location, said lever means providing for said carriage means and said suction means and plate carried thereby an inclined attitude situated between the horizontal and upright attitude of said plate when the latter at said transfer location.

12. The apparatus of claim 11 and wherein a fluid-pressure means is operatively connected with said lever means for turning the latter.

13. The apparatus of claim 7 and wherein a damping means is situated in the path of falling movement of said rod to said transport conveyer means for damping the falling of said rod.

14. The apparatus of claim 7 and wherein a damping means is situated in the path of swinging movement of said plate from said transfer location to said upright attitude for engaging said plate and damping the swinging thereof when said plate reaches said upright attitude.

15. The apparatus of claim 7 and wherein said rod is hollow at least at opposed end regions thereof, and said rod-engaging means including a pair of pins to be displaced into the hollow end regions of said rod by said means connected operatively with said pair of rod-engaging means.

16. The apparatus of claim 7 and wherein said pair of rod-engaging means are supported not only for movement into and out of engagement with said rod but also for turning movement substantially about the axis of said rod, and said pair of rod-engaging means having hollow portions for receiving said rod.

17. The apparatus of claim 7 and wherein said means connected with said manufacturing line conveyer means and with said means for raising said suction means for actuating both of the latter means to resume operation of said manufacturing line conveyer means and to return said suction means to said initial position thereof operates in response to reaching of said transfer location by said plate to provide for simultaneous return of said suction means to said initial position thereof and operation of said manufacturing line conveyer means.

* * * * *